United States Patent

Fukushima et al.

[11] Patent Number: 5,330,349
[45] Date of Patent: Jul. 19, 1994

[54] INJECTION MOLD HAVING A CYLINDRICAL DOWN GATE

[75] Inventors: Yuichi Fukushima, Saitama; Keiichiro Uchida, Tokyo, both of Japan

[73] Assignee: Sony Corporation, Japan

[21] Appl. No.: 36,261

[22] Filed: Mar. 24, 1993

[30] Foreign Application Priority Data

Mar. 30, 1992 [JP] Japan .................... 4-103466

[51] Int. Cl.⁵ .............................. B29C 45/20
[52] U.S. Cl. ................ 425/549; 264/328.15; 425/573
[58] Field of Search .................. 425/549, 573; 264/328.15

[56] References Cited

FOREIGN PATENT DOCUMENTS 186413  7/1986  European Pat. Off. ............ 425/573

*Primary Examiner*—Tim Heitbrink
*Attorney, Agent, or Firm*—Ronald P. Kananen

[57] ABSTRACT

The present invention provides a gate apparatus for injection molding, that enables injection-molding moldings having a relatively small height and forming a plurality of cavities in an associated injection-molding die, the number of the cavities being greater than that of the cavities of the conventional injection-molding die of the same size. The gate assembly comprises an injection-molding die having a female die provided with a cavity, a down gate having an upper cylindrical portion, a middle taper portion and a lower small cylindrical hole formed in the lower end of the middle taper portion, and a cross gate formed through a wall separating the cavity and the lower small cylindrical hole; and a nozzle chip having a lower taper portion of a shape conforming to the middle taper portion of the down gate. The nozzle chip is provided with an axial projection axially projecting from the lower end of the lower taper portion, and a conical projection laterally projecting from the lower end of the axial projection. The nozzle chip is inserted in the down gate so that the conical projection is positioned near and opposite to the cross gate.

4 Claims, 3 Drawing Sheets

5,330,349

INJECTION MOLD HAVING A CYLINDRICAL DOWN GATE

BACKGROUND OF THE INVENTION

1. Field of the Invention

The present invention relates to a gate apparatus for use in combination with an injection-molding die for injection-molding a resin and, more particularly, to a gate apparatus suitable for molding a relatively thin molding.

2. Description of the Prior Art

A hot-runner system using a down gate to inject a resin through an upper portion of an injection-molding die into a cavity has been generally used. However, when such a down gate mark is used, a gate is formed on the upper surface of the molding to spoil the appearance of the molding. If a cross gate is formed in the side portion of an injection-molding die, a cold runner is necessary and the runner cannot be kept hot. A known gate apparatus which has been used to obviate such troubles is provided with a cross gate 13 formed in a cylindrical down gate 12 formed in a female die 11 as shown in FIG. 5. The diameter D of the cylindrical down gate 12 is as large as about 30 mm. Therefore, if the injection-molding die is a multiple-cavity die, the cavities need to be formed inevitably at large intervals. Since the height h of the cross gate 13 from the bottom surface of the cylindrical down gate 12 is, for example, as large as about 10 mm, the lower limit of the height H of the molding, which is dependent on the distance between the lower surface, i.e., the lower surface corresponding to the parting line, of the female die 11 and the bottom surface of the cavity of the female die 11, is relatively large. Accordingly, it is difficult to mold a relatively thin molding, such as the half case of a tape cassette, by using such an injection-molding die.

SUMMARY OF THE INVENTION

Accordingly, it is an object of the present invention to provide a gate apparatus capable of being used in combination with a multiple-cavity injection-molding die provided with a plurality of cavities arranged at relatively small intervals and of being used in combination with a multiple-cavity injection molding die for molding moldings having a relatively small height.

A gate apparatus in one aspect of the present invention for use in combination with an injection-molding die comprises a nozzle chip (5) inserted in a cylindrical down gate (2) formed in the female die (1) of the injection-molding die, to inject a molten resin through the nozzle chip (5) and a cross gate (6) formed in the side surface of the cylindrical down gate (2) into a cavity of the injection-molding die. The lower portion of the down gate (2) and the tip of the nozzle chip (5) are tapered off downward, the cross gate (6) is formed in the side surface of the bottom portion of the down gate (2), and the nozzle chip (5) is provided at its tip with a conical projection (8) laterally projecting toward the cross gate (6).

In this gate apparatus for use in combination with an injection-molding die, the height (h) of the cross gate (6) from the bottom surface of the down gate (2) is relatively small because the diameter (d) of the bottom portion of the down gate (2) in which the cross gate (6) is formed is relatively small. Accordingly, the injection-molding die can be provided with cavities for molding moldings having a relatively small height. Since the diameter of the bottom portion of the down gate (2) is relatively small, the injection-molding die can be provided with a plurality of cavities, the number of which being greater than that of the cavities of the conventional injection-molding die of the same size, and hence an increased number of moldings can be molded in one molding cycle. Since the conical projection (8) is formed opposite to the gate (6) at the tip of the nozzle chip (5), the molten resin can be continuously heated and hence can be injected smoothly through the cross gate (6) into the cavity.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
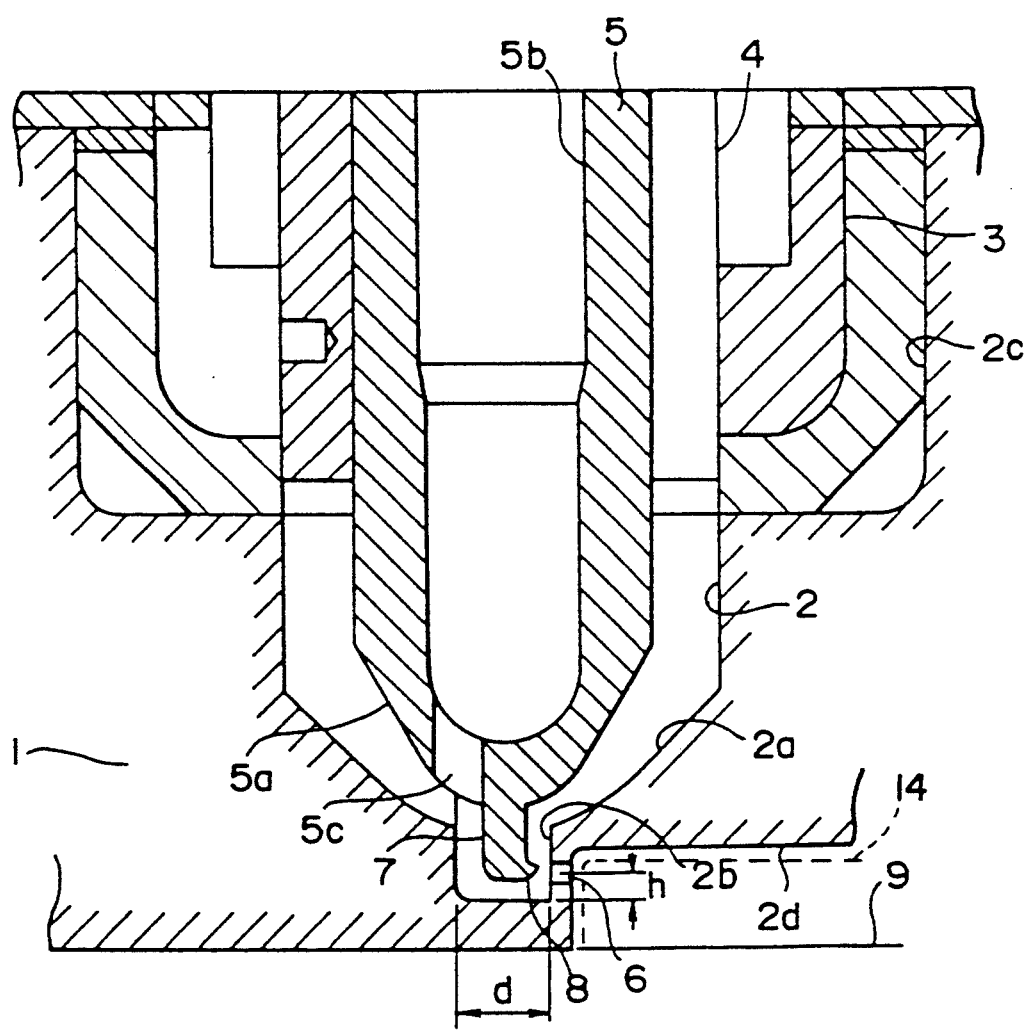
FIG. 1 is a longitudinal sectional view of a gate apparatus in a preferred embodiment according to the present invention for use in combination with an injection-molding die.
Figure 2:
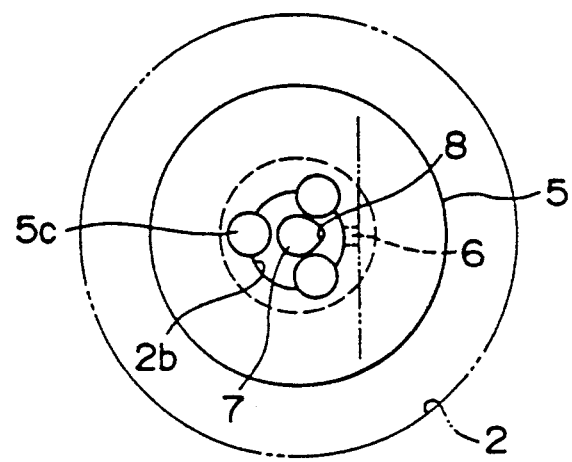
FIG. 2 is a bottom view of the gate apparatus of FIG. 1.
Figure 3:
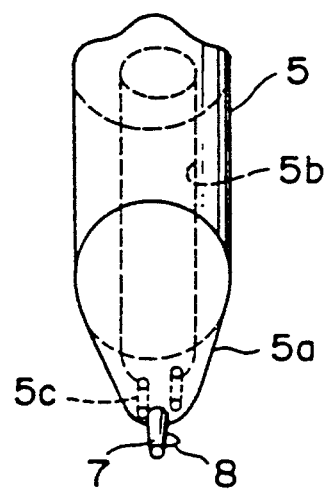
FIG. 3 is a perspective view of a nozzle chip included in the gate apparatus of FIG. 1.
Figure 4:
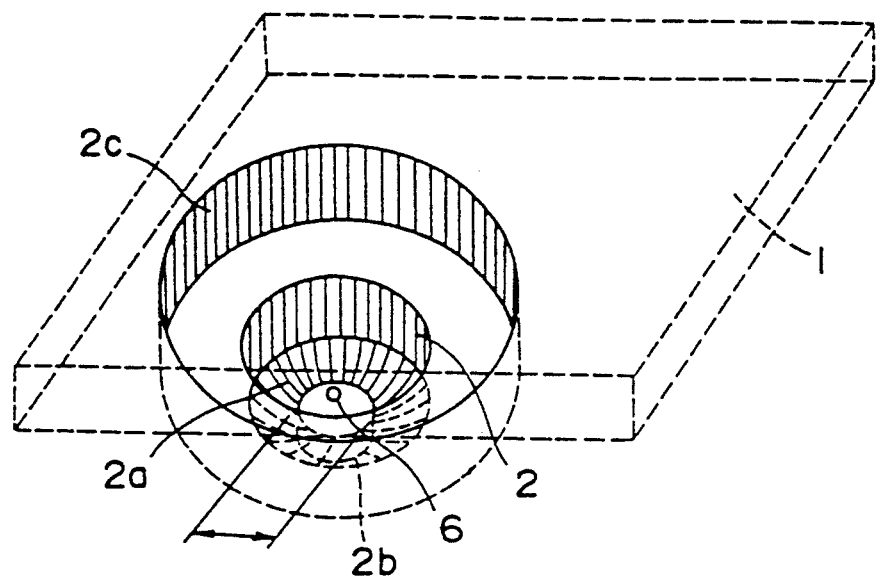
FIG. 4 is a perspective view of the female die of the injection-molding die shown in FIG. 1, provided with a cylindrical down gate.
Figure 5:
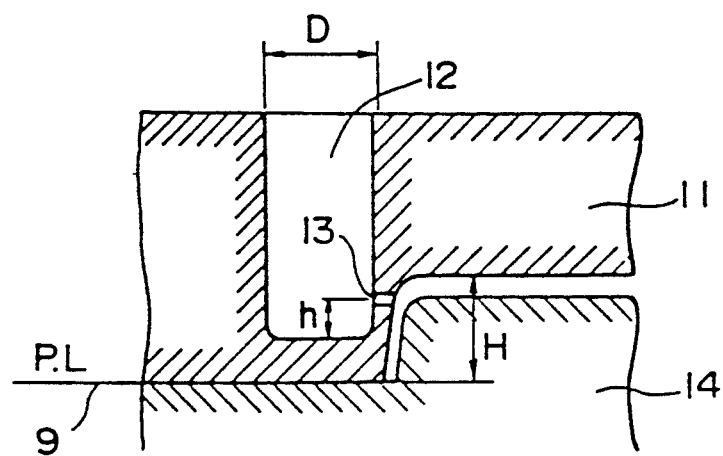
FIG. 5 is a fragmentary sectional view of a conventional gate apparatus.

Referring to FIGS. 1 to 4, an injection-molding die has movable male die 14, i.e., a core, and a fixed female die 1 provided with a cylindrical down gate 2 formed with its axis extended along the width of the female die 1 and having an upper cylindrical portion, a middle taper portion 2a tapered off downward and a small bottom cylindrical hole 2b of a diameter smaller than the upper cylindrical portion, formed in the lower end of the middle taper portion. The fixed female die 1 and the movable male die 14 are joined together along a parting line 9. An expanded cylindrical hole 2c is formed in the upper end of the cylindrical down gate 2. A nozzle chip 5 is fitted coaxially in a sleeve 4, and the sleeve 4 is fitted coaxially in a support ring 3 fitted in the expanded cylindrical hole 2c. The female die 1 is provided with a cavity having a bottom surface 2d corresponding to the upper surface of a molding. A cross gate 6 is formed in a wall separating the small cylindrical hole 2b and the cavity.

The nozzle chip 5 is formed of a metal having a high heat conductivity, such as a BeCu alloy, and is provided with a central bore 5b. The nozzle chip 5 has a lower taper portion 5a having a shape conforming to the taper portion 2a of the cylindrical down gate 2. An axial projection 7 projects axially from the lower end of the taper portion 5a and a conical projection 8 projects laterally from the lower end of the axial projection 7 toward the gate 6. Three injection holes 5c are formed in the lower end of the taper portion 5a round the axial projection 7.

In molding operation, a molten resin flows through the central bore 5b of the nozzle chip 5, and the injection holes 5c formed in the lower taper portion 5a into the small cylindrical hole 2b formed in the lower end of the cylindrical down gate 2 formed in the female die 1. Then, the molten resin is injected through the cross gate 6 into the cavity of the injection-molding die. Since the molten resin staying near the cross gate 6 is heated continuously by the conical projection 8 of the highly heat-conductive nozzle chip 5, no cold chip is formed between the successive injection-molding cycles.

The diameter of the small cylindrical hole 2b formed in the lower end of the cylindrical down gate 2 of the female die 1 is about 4 mm, which is about one-seventh of the diameter D of about 30 mm of the uniformly cylindrical down gate of the female die of the conventional injection-molding die. Therefore, the number of cavities which can be formed in the female die 1 is greater than that of cavities which can be formed in the conventional female die of the same size. Since the height h of the cross gate 6 from the bottom surface of the small cylindrical hole 2b is, for example, as small as about 1.2 mm, which is about a quarter of the height of about 5 mm of the cross gate of the conventional injection-molding die, the female die 1 can be provided with cavities for molding moldings having a relatively small height, such as the half cases of compact tape cassettes.

As is apparent from the foregoing description, the gate apparatus according to the present invention comprises the female die of an injection-molding die, having the cavity, provided with the cylindrical down gate having the upper cylindrical portion, the middle taper portion and the lower small cylindrical hole, the cross gate formed through the wall separating the small cylindrical hole of the down gate and the cavity; and the nozzle chip having a lower taper portion of a shape conforming to the middle taper portion of the down gate, provided with the axial projection axially projecting from the lower end of the lower taper portion, and the conical projection laterally projecting from the lower end of the axial projection, and fixedly inserted in the down gate so that the conical projection is positioned near and opposite to the cross gate of the female die. Accordingly, cavities can be formed at relatively small intervals in the female die, the female die can be provided with cavities for molding moldings having a relatively small height, and cold chips will not be formed between the successive molding cycles.

What is claimed is:

1. A gate apparatus for injection molding, comprising:
   an injection-molding die arrangement including a male die and a female die provided with a cavity, one of said dies including a cylindrical down gate having an upper cylindrical portion, a middle taper portion and a lower small cylindrical hole of a diameter smaller than the upper cylindrical portion, and a cross gate formed through a wall separating the cavity and the lower small cylindrical hole; and
   a nozzle chip having a lower taper portion of a shape conforming to the middle taper portion of the down gate, said nozzle chip being provided with an axial projection which axially projects from the lower end of the lower taper portion and which is provided with a conical projection laterally projecting from the lower end of the axis projection, an injection passage extending through said nozzle chip and communicating with said down gate said nozzle chip being fixedly inserted in the down gate so that the conical projection is positioned so as to extend toward and into immediate proximity of said cross gate.

2. A gate apparatus according to claim 1, wherein said nozzle chip is formed of a metal having a high heat conductivity, and is provided with a plurality of injection holes formed through the wall of the lower taper portion, said plurality of injection holes fluidly communicating with said injection passage associated with said nozzle chip.

3. A gate apparatus according to claim 2, wherein said conical projection is integrally formed with said nozzle chip so that heat is conducted thereto though the high heat conductive metal of a main body portion of said nozzle chip.

4. A gate apparatus according to claim 2, wherein said injection passage comprises a central bore which is formed in said nozzle chip and which fluidly communicates with said plurality of injection holes.

* * * * *